United States Patent [19]

Gee et al.

[11] 4,316,176

[45] Feb. 16, 1982

[54] TIRE PRESSURE MONITOR AND SELF CHECK SYSTEM THEREFORE

[75] Inventors: Thomas A. Gee, Allen Park; Joseph A. Tremba, Farmington Hills, both of Mich.

[73] Assignee: Eaton Corporation, Cleveland, Ohio

[21] Appl. No.: 106,783

[22] Filed: Dec. 26, 1979

[51] Int. Cl.³ .................... B60C 23/02; G08B 21/00
[52] U.S. Cl. .................... 340/58; 73/146.5; 235/92 PE; 340/512; 340/526; 340/539; 340/626
[58] Field of Search .................... 340/58, 539, 695; 73/146.5; 340/512, 526, 626; 328/120; 235/92 PE

[56] References Cited

U.S. PATENT DOCUMENTS

| | | | |
|---|---|---|---|
| 3,178,686 | 4/1965 | Mills | 340/626 X |
| 3,533,063 | 10/1970 | Garcia | 340/58 |
| 3,581,277 | 5/1971 | Beatty, Jr. et al. | 340/58 |
| 3,691,524 | 9/1972 | Frost et al. | 340/58 |
| 3,707,701 | 12/1972 | Neu | 340/58 |
| 3,938,077 | 2/1976 | Nahanishi et al. | 340/58 |
| 3,976,989 | 8/1976 | Smith | 340/626 X |
| 4,086,564 | 4/1978 | Claxton | 340/58 |
| 4,130,817 | 12/1978 | Hill et al. | 340/58 |

FOREIGN PATENT DOCUMENTS 2037125 7/1980 United Kingdom .................... 340/58

*Primary Examiner*—John W. Caldwell, Sr.
*Assistant Examiner*—Joseph E. Nowicki
*Attorney, Agent, or Firm*—R. J. McCloskey; J. G. Lewis

[57] ABSTRACT

Tire pressure monitors are incorporated in vehicles having pneumatic tires (14) to continuously or periodically measure the air pressure within the tires and to alert the driver should the pressure in one of the tires fall below a predetermined value. A self-contained battery powered rf transmitter unit (10) is affixed within the drop center (22) of each wheel (12) and includes a pressure sensing switch (84). The battery is contained within a housing (20) mounted to the external surface of the wheel adjacent a fill valve (30) through which electrical wires (50) are routed to the transmitter (11). The transmitter emits a pulse every 33 seconds when the air pressure within the tire is above a prescribed value. A receiver (13), located in the passenger compartment of the vehicle, receives the signal(s) from the transmitters and counts the number of signals received over a given time period established by an internal pulse generator. If fewer than a predetermined number of pulses are received during any given time period, a fault condition is indicated and the driver is appropriately warned. The system also has self-check features wherein upon start-up of the associated vehicle, a warning light (320) and buzzer (322) are turned on until the first correct sequence of signals are received from the transmitters.

29 Claims, 10 Drawing Figures

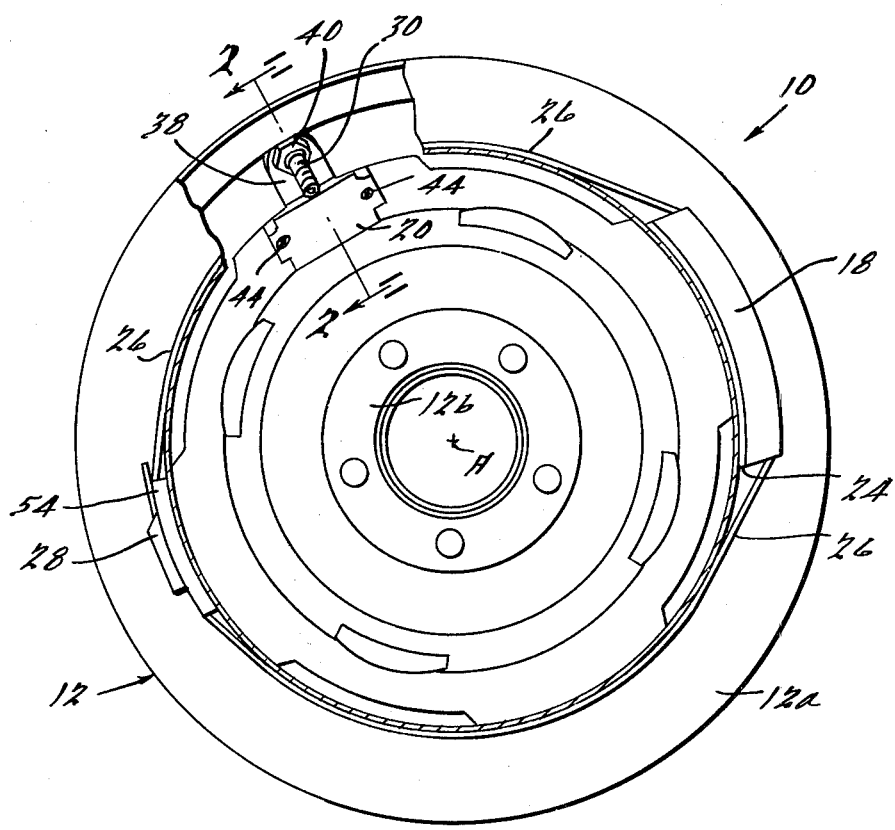
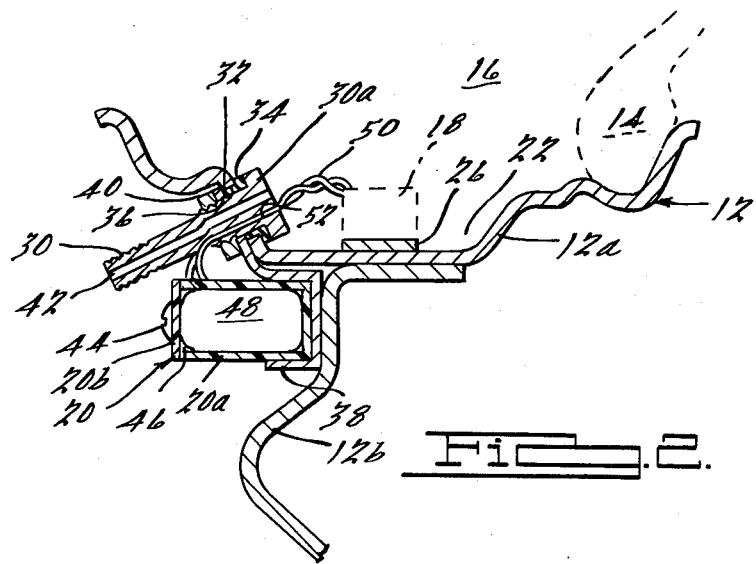

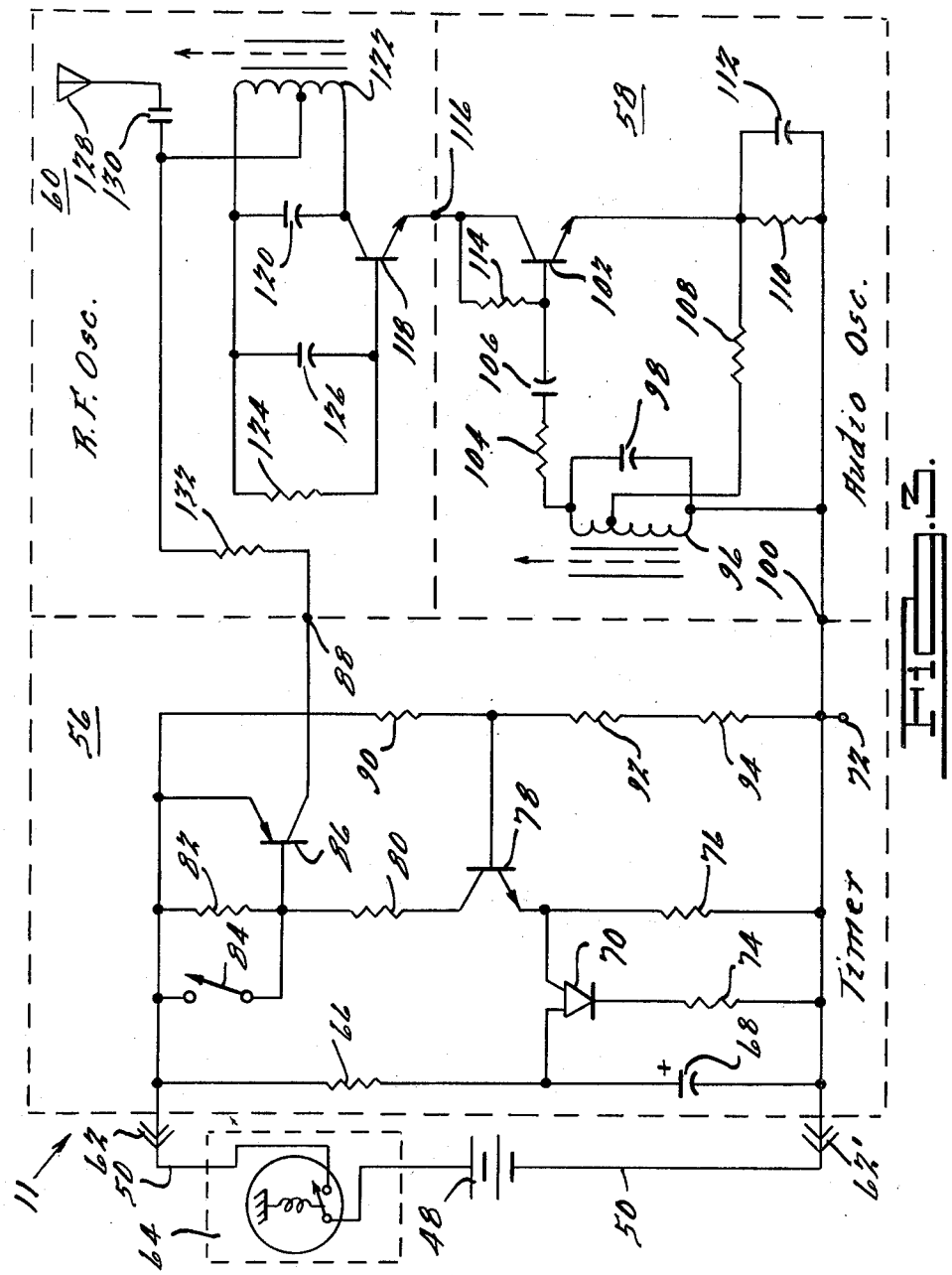

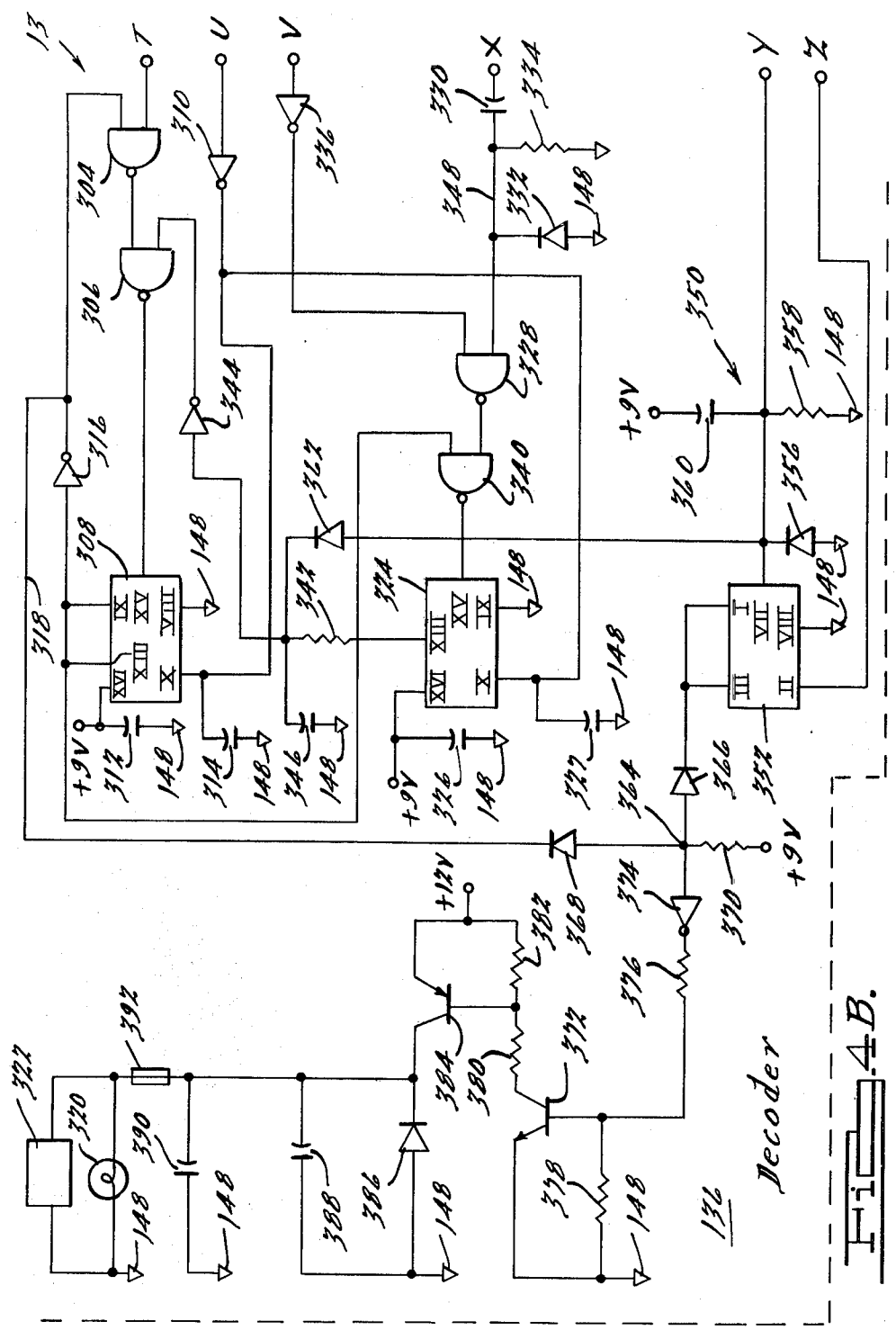

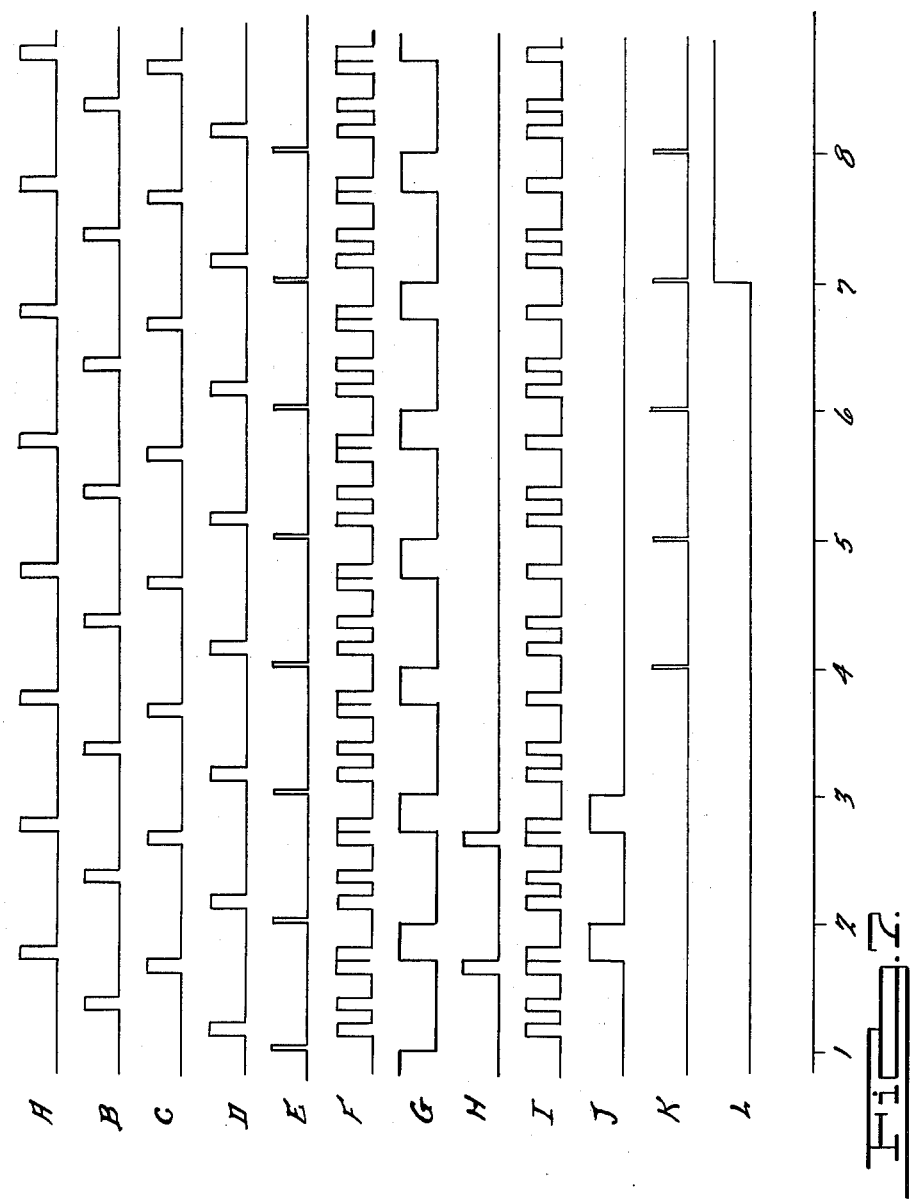

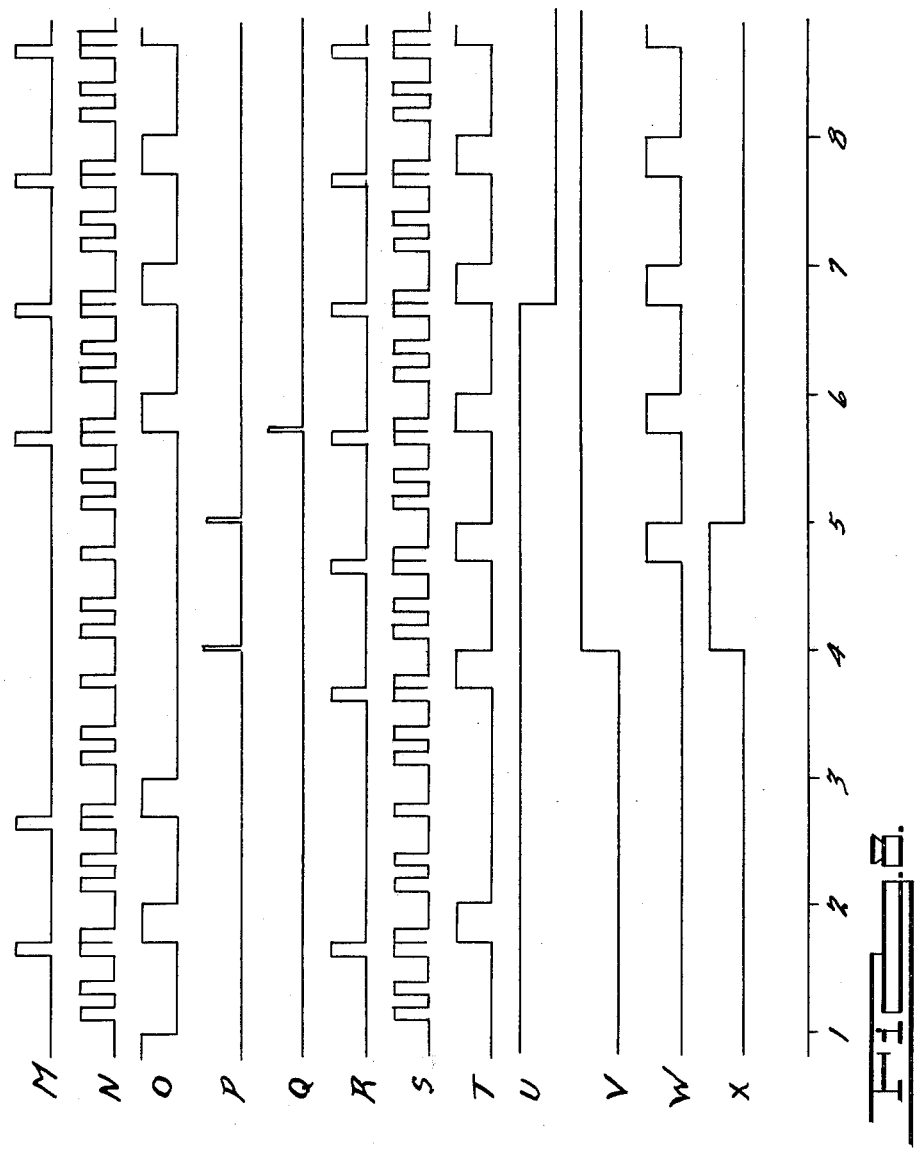

TIRE PRESSURE MONITOR AND SELF CHECK SYSTEM THEREFORE

INTRODUCTION

This invention relates to apparatus for monitoring fluid pressure in pneumatic tires and specifically to such systems which continuously monitor fluid pressure in each tire of an associated vehicle and provide a warning signal to the operator should a low tire pressure condition occur.

BACKGROUND OF THE INVENTION

Since the invention of the pneumatic tire and its application to motor vehicles such as automobiles, trucks, and the like, many schemes have been proposed to monitor the fluid pressure in the tires during operation of the vehicles. Such systems facilitate maintaining optimum fluid pressure in pneumatic tires which, in turn, reduces the changes of catastrophic loss of vehicle control as well as extending tire life.

A problem in any tire pressure monitor is the transmission of fluid pressure information from the tire, i.e., a rotating body, to the operator, i.e., a relatively fixed body. Most prior approaches to this problem fall within three general catagories. The first approach is the direct reading of fluid pressure in a tire in which sealed, rotating fittings or electrical slip rings are employed in the interface between the wheel and vehicle body. The second approach is the transmission of fluid pressure information through an inductive coupling involving two transducers, one on the wheel and the other on the vehicle body, which are in precise rotational alignment with one another. The third approach is the application of transmitters and receivers which use the atmosphere to bridge the interface between the wheel and body. The first two approaches have several shortcomings. First, relatively expensive high precision components are needed in the slip rings, and inductive coupling transducers must remain in alignment at all times during operation of the vehicle. Additionally, both are prone to corrosion and mechanical wear at the point of interface as well as requiring relatively expensive body wiring from each wheel to a central location within the vehicle body.

Of the tire pressure monitors which have been commercially successful, most have followed the third approach, i.e., they have employed a transmitter affixed to each wheel which operates in conjunction with a receiver disposed within the vehicle body. These systems tend to be extremely expensive, however, and require a breaking down of the tire from the wheel in order to service and/or replace the battery which powers the transmitter. Additionally, many prior transmitter-receiver approaches were of the near field type, requiring an antenna to be placed within one wave length of the transmitting antenna. This necessitated expensive and inconvenient body wiring from a central area on the vehicle body to a point adjacent each wheel. Finally, a few of the prior systems had the ability to verify that the system was operating correctly, i.e., had a self-check feature. Such prior systems typically comprised no more than a circuit continuity scheme in which a characteristic resistance was incorporated within the wheel mounted tire pressure switches and a window comparator function included in the receiver logic. These systems added more components and expense to the system without necessarily improving the reliability. Additionally, due to the dynamic vibration involved in normal vehicle operation, most prior systems have generally tended to deteriorate over a relatively short period of time, and those that did not suffer rapid deterioration were prohibitively costly for use with private passenger vehicles.

Finding a compromise solution for these problems has recently become more urgent in light of government and industry interest in the elimination of "spare" tires for cost and weight reasons and substituting "run flat" tires coupled with a tire pressure monitor.

It will be apparent from a reading of the specification that the present invention may be advantageously utilized with pneumatic tires intended for many different applications. However, the invention is especially useful when applied to relatively high speed "on road" motor vehicle, and will be described in connection therewith.

CROSS REFERENCES

The subject matter of the present application is related to that of U.S. application Ser. No. 959,553, filed Nov. 13, 1978 and U.S. application Ser. No. 970,953, filed Dec. 20, 1978.

BRIEF DESCRIPTION OF THE INVENTION

The present invention relates to a tire pressure monitor of the type wherein a transmitter monitors the air pressure within a tire and transmits tire inflation condition signals to a receiver when the air pressure falls above or below a predetermined range of values. According to the present invention, the monitor includes a transmitter which generates a succession of tire inflation condition signals when pressure within the tire falls within a predetermined operating range and a receiver which receives and counts the tire condition signals and generates an operator altering signal when less than a predetermined number of the tire condition signals are received during a preestablished increment of time. This arrangement has the advantage of providing a tire pressure monitoring system which periodically transmits information confirming that the tire is inflated to the proper pressure level and that the transmitter is functioning properly.

According to another aspect of the invention, the time increment is defined by two consecutive pulses of a secession of pulses generated internally within the receiver. If less than the predetermined number of tire condition signals are received during any one of set increments, the operator altering signal is generated. This arrangement provides the advantage of effecting continuous monitoring of vehicle tire pressure while only periodically generating tire inflation condition signals.

According to another aspect of the invention means are provided to detect start-up of the associated vehicle and to generate a second operator alerting signal until a predetermined number of signals are received between two consecutive timing pulses. This arrangement provides the advantage of providing a self-check feature which presents system condition information to the vehicle operator at a time when is physiologically attuned to be receptive to such information.

According to still another aspect of the invention, the transmitter means comprises a battery mounted on the outside surface of the associated wheel, and RF generator mounted in the drop center of the associated wheel within the tire cavity and a pressure sensing switch which is disposed within the drop center of the wheel and housed commonly with the RF transmitter. This arrangement provides the advantage of a simple system in which the transmitter portion is protectively housed within the tire cavity while the power supply therefore, in the form of a battery is readily accessable.

These and other features and advantages of this invention will become apparent upon reading the following specification, which, along with the patent drawings, describes and discloses a preferred illustrative embodiment of the invention in detail.

The detailed description of the specific embodiment makes reference to the accompanying drawings.

BRIEF DESCRIPTION OF THE DRAWINGS

FIG. 1, is a front, broken view of a standard automobile wheel illustrating assembly and packaging of the transmitter portion of the present invention;

FIG. 2, is a partial cross-sectional view through the rim portion of the wheel of FIG. 1;

FIG. 3, is a schematic diagram of the transmitter portion of the system;

FIGS. 4A through 4C collectively constitute a schematic diagram of the receiver portion of the present invention;

FIGS. 7 and 8 represent selected graphs of electrical signals taken in various locations within the circuit of the present invention over a number of cycles of operation and in differing operating modes.

DETAILED DESCRIPTION OF THE SPECIFIC EMBODIMENT

Figure 4A:
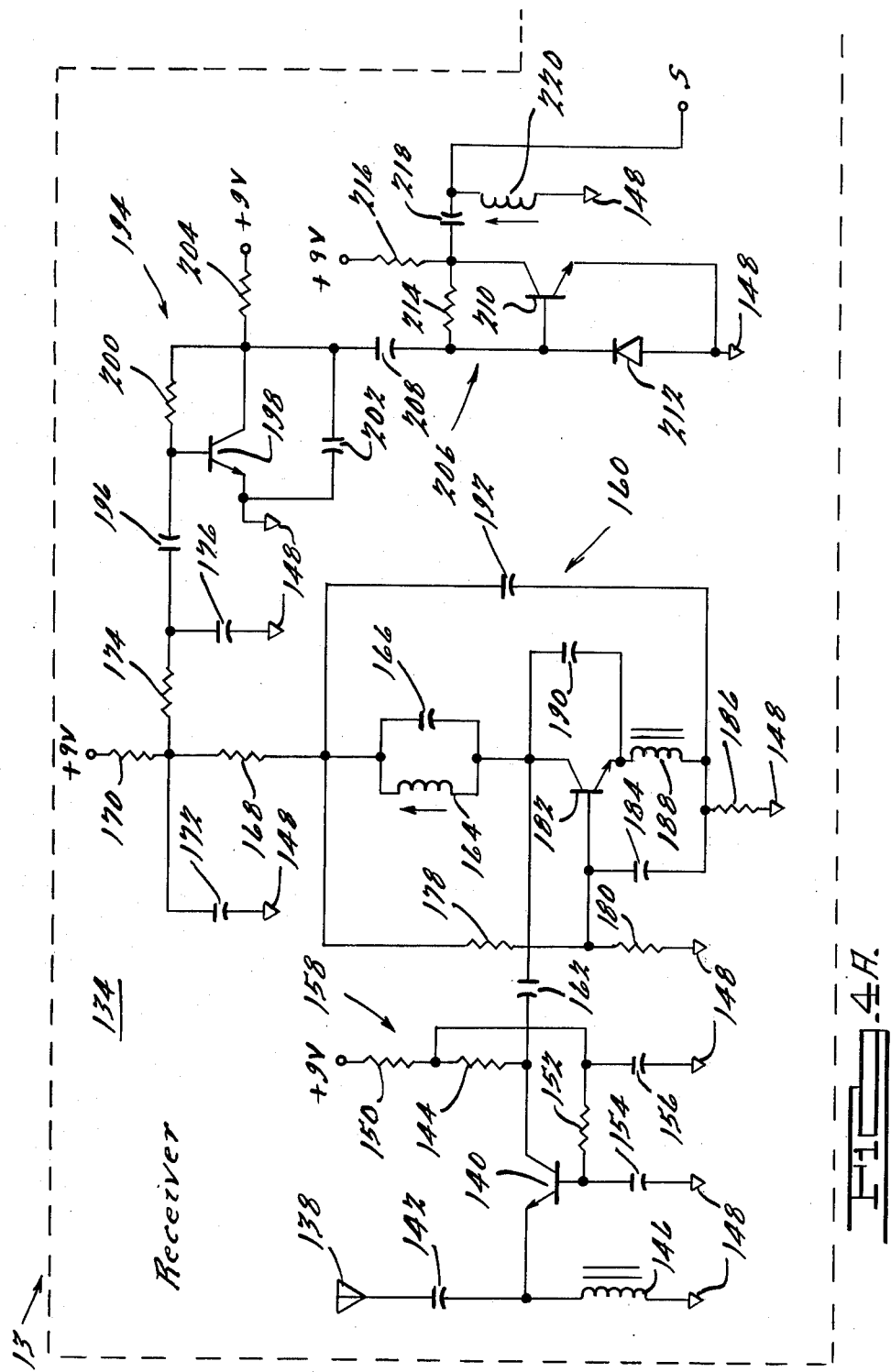

The present invention relates, in its preferred embodiment, to a tire pressure monitoring system which, due to its simplicity and low cost, is practical for application with private, passenger motor vehicles. The system has two basic elements, a wheel mounted transmitter unit (transmitter means) associated with each pneumatic tire and wheel assembly and a receiving unit located within the chassis of the associated vehicle. An illustration of the general environment of the present invention is contained in FIG. 1 of copending U.S. patent application Ser. No. 959,553 filed Nov. 13, 1978. The receiving unit is preferably located near the vehicle operator's designated seating position and includes driver or operator attention attracting devices (incandescent light and buzzer) therein. As will be described in greater detail hereinbelow, the attention attracting devices are positioned to accommodate the operator's physiological responses to maximize the likelihood of system generated tire condition information being transmitted to the operator.

Referring to FIGS. 1 and 2, a transmitter unit, generally designated by the reference FIG. 10 is illustrated mounted on the typical automobile wheel 12. Inasmuch as the structure and operation of transmitter unit 10 is reproduced for each wheel 12 and pneumatic tire on the associated vehicle, the detailed description will only be given once for the sake of brevity. Wheel 12 is composed of a rim 12A and a hub 12B. Rim 12A supports a pneumatic tire 14 (illustrated in phantom) in the usual manner and, in combination with the tire 14, defines an annular tire cavity 16 which, in application, is pressurized to a predetermined operating level.

Transmitter unit 10 is two basic components, a transmitter/pressure switch package 18 and a battery package 20. Transmitter/switch package 18 is centrally disposed within a "drop center" 22 defined by rim 12A, and is longitudinally crescent shaped to conform with the radially outward most surface of rim 12A within drop center 22. A rubber shock mounting pad 24 is interposed between transmitter/switch package 18 and rim 12A. A clamping band 26 girdles rim 12A within drop center 22 and overlays transmitter/switch package 18 to secure it in the illustrated position. The ends of clamping band 26 are secured to one another with a screw clamp assembly 28 which operates to hold the illustrated assembly in tension during operation of the vehicle and overcome centrifugal forces exerted on transmitter/switch package 18 during rotation of wheel 12.

Transmitter/switch package 18 also houses transmitter circuitry which will be described in detail herein below. A tire inflation fill valve 30 extends outwardly through an aperture 32 in rim 12A of wheel 12. Valve 30 has an area of increased diameter 30A within drop center 22 which abuts the inner surface of drop center 22 in the area periferially surrounding aperture 32 through an intermediate rubber seal 34. Fill valve 30 also passes through an aperture 36 in a battery package mounting bracket 38 and threadedly engages a fill valve mounting nut 40. Bracket 38, seal 34 and rim 12A are thus sandwiched between area of increased diameter 30A and nut 40, retaining fill valve 30 in the illustrated position. A longitudinal passageway 42 within fill valve 30 interconnects tire cavity 16 with the atmosphere. Passage 42 is closed by a conventional valve core (not illustrated) which operates in the usual manner.

Bracket 38 embracingly retains battery package 20 in the illustrated position such as by gluing, ultrasonic welding or other suitable process. Battery package 20 comprises a body portion 20A and a top portion 20B assembled with screws 44 or the like. Portions 20A and 20B are constructed of a plastic or other suitable material and define a battery receiving cavity 46 within which is nestingly disposed a conventional nine volt battery such as Model MN1604, manufactured by P. R. Mallory and Company, Inc. For the purposes of this specification, specific manufactures and model numbers of components are given only for means of example. They are not intended to be limiting in ay way and can be readily interchanged with other commercially available alternative components.

A twisted pair of electrical lead wires 50 are connected at one end to the terminals (not illustrated) of battery 48 within battery receiving cavity 46 and are routed through an axially aligned passageway 52 within fill valve 30, extending into tire cavity 16. Leads 50 have rubber insulative coatings or the like which isolate their conducting portions from fill valve 30 as well as sealing passageway 52 to prevent the escape of air therethrough.

Although FIG. 1 illustrates transmitter/switch package 18 as being revolved approximately 90 degrees clockwise from fill valve 30, in application, the two would be angularly coincident as illustrated in FIG. 2 wherein package 18 is illustrated in phantom. The reason for this is two-fold. One is to minimize the length of twisted leads 50 as they terminate inwardly from passageway 52 into package 18 and ultimately for interconnection with the transmitter circuitry (not illustrated). Minimized lead routing will reduce the chances of inadvertent damage to transmitter unit 10 during mounting or breaking down of tire 14 from rim 12. The second consideration is that of balancing transmitter unit 10 about the axis (A) of wheel 12. With package 18 positioned as illustrated in FIG. 2, the weight of packages 18 and 20 as well as fill valve 30 are negated by the use of a counter weight 54 which is included as part of a screw clamp assembly 28, positioned circumferentially distal transmitter unit 10. This arrangement, with the selection of a proper counter weight 54 effects substantially perfect radial balancing of wheel 12. Although some axial imbalance is introduced through the positioning of fill valve 30 and battery 48 leftwardly (referring to FIG. 2) from counter weight 54 (which, in FIG. 2, will be coincident with clamping band 26) such imbalance can be compensated through the use of conventional tire balancing weights which clip to rim 12A in the usual manner.

The present arrangement illustrated in FIGS. 1 and 2 thus has the advantage of securing the electronic components of transmitter unit 10 within the sealed environment of tire cavity 16 while permitting easy access to battery package 20 for the replacement for servicing of battery 48 without the necessity of dismounting and braking down wheel 12 and tire 14. Additionally, it is contemplated that a wheel cover of hub cap would be included with the present system to cover package 20 and mounting bracket 38 whereby only the leftward most extend (referring to FIG. 2) of fill valve 30 would be visible when the system is installed on a typical passenger vehicle.

Referring to FIG. 3, a schematic diagram of transmitter unit 10 is illustrated. The circuit will be reproduced within each transmitter unit 10 associated with each wheel 12 and tire 14 mounted on the associated vehicle. The circuit of transmitter 10 is composed of a timer circuit 56, an audio oscillator 58 and an RF oscillator 60. Battery 48 is electrically interconnected to input terminals 62 and 62' of timer circuit 56 through twisted leads 50. An optional normally open switch 64 is illustrated as being electrically connected in series with battery 48 and operates to energize transmitter 10 when the wheel 12 associated therewith is rotating, i.e. the switch closes under the influence of centrifugal forces. The switch is physically mounted at a point spaced from the axis of rotation A of wheel 12 such as within transmitter unit 10. Switch 64 operates to deenergize the circuit of transmitter 10 during static conditions of the associated vehicle and thereby prolong the life of battery 48. When optional switch 64 is employed, an enabling circuit must be included in the receiver portion of the system for reasons which will become apparent upon further reading of the specification.

Input terminals 62 and 62' are electrically interconnected by a series combination of a 1.5 Mohm resistor 66 and a 25 MF electrolytic capacitor 68. The point of common connection between resistor 66 and capacitor 68 is connected to the anode of a type No. 2N6028 programmable unijunction transistor (PUT). It is to be understood that for the purposes of the present specification, specific component values and manufacturer type numbers are given only as examples. Other equivalent commercially available components can be substituted. The specifically recited components are not to be considered limiting in any way. Input terminal 62' (associated with capacitor 68) is electrically connected to a tie point 72. The cathode of PUT 70 is interconnected to tipe point 72 through a 240 ohm resistor 74. The gate of PUT 70 is electrically interconnected to tie point 72 through a 1 Mohm resistor 76. The gate of PUT 70 is also electrically interconnected to the emitter of a type 2N5172 transistor 78. The collector of transistor 78 is electrically interconnected to input terminal 62 through a series combination of a 5.1 Kohm resistor 80 and 1.1 Kohm resistor 82. The contacts of a tire pressure sensing switch 84 are connected in parallel with resistor 82.

The point of common connection of resistors 80 and 82 is also connected directly to the base of a type 2N6076 transistor 86, the emitter of which is connected to input terminal 62 (associated with resistor 66). The collector of transistor 86 is connected to a timer circuit output terminal 88 which feeds RF oscillator circuit 60. The base of transistor 78 is interconnected with the tie point 72 through a series combination of a 620 Kohm resistor 92 and a trimming resistor 94, the value of which will vary from substantially zero to approximately 200 Kohm depending principally upon tolerance stack-up in timer circuit 56, as will be described in detail herein below.

The output of timer 56 is connected to RF oscillator circuit 60 through terminal 88. Oscillator circuit 58 comprises a tunable inductor 96 connected in parallel with a 3,900 PF capacitor 98. One end of the parallel combination is electrically connected to tie point 72 in timer circuit 56 through an interfacing terminal 100. The other end of the parallel combination is connected to the base of a type 2N5172 transistor 102 through a parallel combination of a 3.9 Kohm resistor 104 and a 0.039 MF capacitor 106. The emitter of transistor 102 is connected to a tap in inductor 96 through an intermediate 220 ohm resistor 108 and to tie point 72 through a parallel combination of 820 ohm resistor 110 and 4,700 PF bypass capacitor 112. The collector of transistor 102 is interconnected with the base of transistor 102 through an 82 Kohm resistor 114 and to a terminal 116 interfacing audio oscillator 58 with RF oscillator 60.

Terminal 116 represents the output of audio oscillator 58 which is connected to the emitter of a of a type 2N3662 transistor 118 in RF oscillator 60. The collector of transistor 118 is connected to one end of a parallel combination of a 2.2 PF capacitor 120 and a tunable inductor 122. The other end of the parallel combination of capacitor 120 and inductor 122 is connected to the base of transistor 118 through a parallel combination of a 22 Kohm resistor 124 and a 5 PF capacitor 126. A tap of inductor 122 is interconnected to a transmitting antenna 128 through a 2.2 PF coupling capacitor 130 and timer output terminal 88 through a 470 ohm current limiting resistor 132. Antenna 128 is integrally constructed with the circuit board (not illustrated) which structurally supports the individual components of circuit 11 within transmitter package 10.

TRANSMITTER OPERATION

When power is first applied to circuit 11 through the connection of battery 48 (and closing of the contacts of optional switch 64) there to, current will flow through a voltage divider network comprised of resistors 90, 92 and 94 to virtually instantaneously establish a threshold voltage on the base of transistor 78. Transistor 78 operates as an emitter follower and will impress a fixed reference voltage on the gate of PUT 70 equal to the threshold voltage minus the base to emitter drop across transistor 78. Transistor 78 will be on and will establish a current flow through the collector thereof as well as resistors 80 and 82. Resistor 82 is sized so that the voltage drop thereacross, which is impressed upon the base of transistor 86, is small enough to keep transistor 86 off. At the same time, current is flowing through resistor 66 and capacitor 68 operating to impress and exponentially increasing voltage level on the anode of PUT 70. When PUT anode voltage exceeds its gate voltage by one junction drop, PUT 70 triggers. At that time, a relatively high current is drawn from capacitor 68 through the anode cathode junction of PUT 70 and back to tie point 72 through current limiting resistor 74 which establishes the decay time as well as the time which PUT 70 is in conduction.

When PUT 70 triggers and is conducting, a high gate current is established. The high gate current is drawn through the collector emitter junction of transistor 78 as well as resistors 80 and 82. The increased current through resistor 82 creates a large enough voltage drop to turn on transistor 86 and thus produce an approximately nine volt output pulse through terminal 88. When capacitor 68 is discharged to the point that substantially all of the current flowing into the anode of PUT 70 is drawn through resistor 66, the current will have decreased to a point below the specified characteristic holding current or the valley current of PUT 70, thereby turning the device off. When PUT 70 turns off the gate current drops sharply as does the current through resistor 82. The voltage level therefore impressed upon the base of transistor 86 will be reduced to a point at which the transistor shuts off. With the components having values as specified herein, a timer output signal is generated through terminal 88 which will have a characteristic period of 33 plus or minus 0.5 seconds and a pulse on time (when transistor 86 is conducting) of approximately 30 ms. Audio oscillator 58 operates to generate a 20 KHz square wave output at terminal 116 which modulates RF oscillator 60 which, in turn, generates a 300 MHz signal. The output of oscillator 60 modulates the time output signal and impresses it upon transmitting antenna 128 through coupling capacitor 130. Operation and audio oscillator 58 and RF oscillator 60 are substantially as described in the description of FIG. 5 of application U.S. Ser. No. 959,553, filed Nov. 13, 1978, which is incorporated herein by reference. Additionally, it is contemplated that a generator such as described in application U.S. Ser. No. 959,553 could be substituted for battery 48 and a detailed description thereof is hereby incorporated by reference.

Referring to FIGS. 7 and 8, characteristic signals taken at various points in the tire pressure monitoring system are illustrated. Signals A through D represent the wheel signals generated locally at each of the four wheels of a representative passenger vehicle. Generation of those signals is not synchronized in any way so the relative position of the pulses from one wheel to another is random. Because the pulse period is so short compared to the total period of the wheel signals, the chances of signals from two wheels precisely coinciding with one another is remote. Even if that happens however, the present invention can distinguish randomly coinciding pulses from two wheels from a failure mode inasmuch as the relative positioning of the pulses will tend to drift slightly due to operating dynamics of the circuit and thus two coinciding signals may remain that way for one or two cycles of operation. But the chances of that condition remaining for a long enough period of time to trigger a false low tire condition signal is extremely remote.

The generation of a valid low tire condition signal is initiated by the closing of switch 84 due to loss of air from the associated tire cavity 16. When switch 84 closes it effectively shorts cut switch 82 and the base emitter junction of transistor 86, preventing transistor 86 from switching on even when PUT 70 is triggered to the on position. This situation is depicted graphically in signal H of FIG. 7, in which during the third cycle of operation of Wheel C, switch 84 closes and prevents generation of further pulses.

Figure 4C:
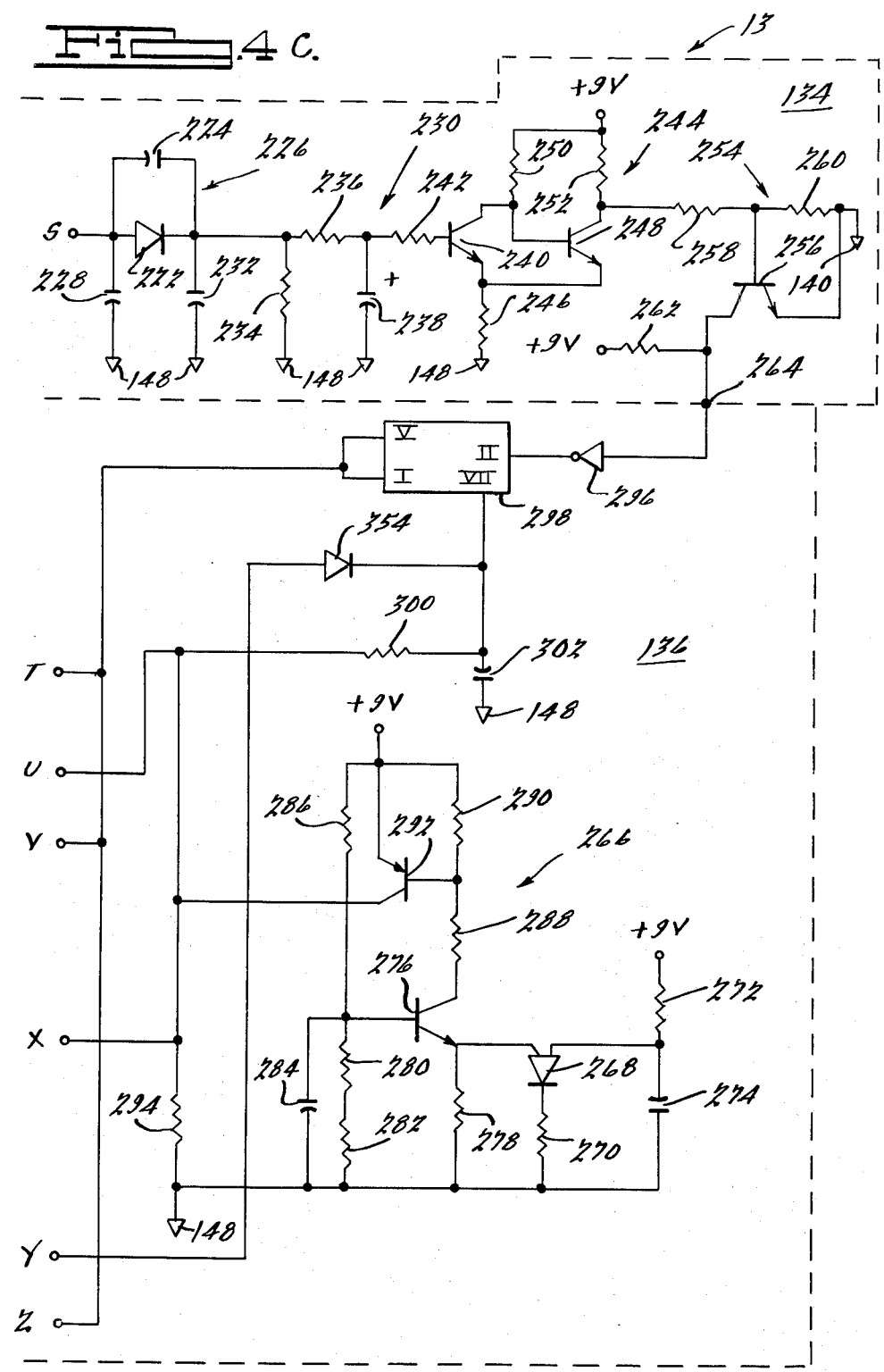
Figure 5:
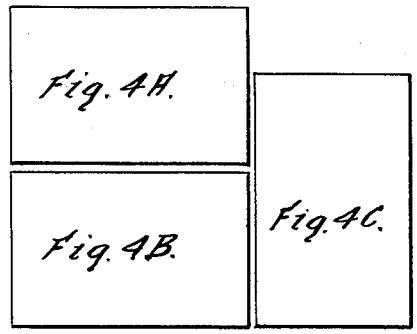
FIG. 5, is a drawing figure key, illustrating the proper arrangement of FIGS. 4A through 4C.

Referring to FIG. 5, a key to the arrangement of the pages of drawings containing FIGS. 4A, 4B, and 4C is given. FIGS. 4A, 4B, and 4C define a receiver unit circuit 13 which is subdivided into a receiver circuit 134 and a decoder circuit 136. Receiver circuit 134 is contained on the entirety of FIG. 4A and upper portion of FIG. 4C and decoder circuit 136 is contained on the entirety of FIG. 4B and lower portion of FIG. 4C as depicted by encircling dotted lines.

Referring specifically to FIG. 4A, a receiving antenna 138 is interconnected to the emitter of a type 2N3662 transistor 140 through a 5PF decoupling capacitor 142. The emitter of transistor 140 is also interconnected to tie point 148 through a 0.9 UH choke 146 which serves as a low frequency rejection filter. The collector of transistor 140 is interconnected to the +9 volt direct current (VDC) tap of a regulated power supply through a series combination of a 1 Kohm resistor 144 and second 1 Kohm resistor 150 which coact to form a voltage divider network. The point of common connection between resistors 144 and 150 is interconnected with the base of transistor 140 through a 220 Kohm resistor 152. The base of transistor 140 as well as the point of common connection of resistors 144 and 150 are both separately interconnected with the tie point 148 through 100 PF capacitors 154 and 156 collectively comprise a buffer amplifier generally designated as 158 which receives incoming signals from antenna 138 through decoupling capacitor 142 and passes them on to a super-regenerative detector generally designated 160 through a 5PF coupling capacitor 162.

Detector 160 has an input from capacitor 162 which is connected to a parallel combination of a tunable inductor 164 and a 1PF capacitor 166. The other end of the parallel combination of inductor 164 and capacitor 166 is connected to the +9 VDC power supply through a series combination of 1 Kohm resistor 168 and another 1 Kohm resistor 170. The point of common connection between resistors 168 and 170 is interconnected to tie point 148 through a 0.01 MF capacitor 172 and to tie point 148 through a series combination of a 3.3 Kohm resistor 174 and a 0.0022 MF capacitor 176. The end of parallel combination of inductor 164 capacitor 166 associated with resistor 168 is also interconnected with tie point 148 through a series combination of 10 Kohm resistor 178 and a 22 Kohm resistor 180. The point of common connection of resistor 178 and resistor 180 is connected directly to the base of a transistor 182 of the type manufactured by Motorola, Inc. model MP5-H10 and to tie point 148 through a series combination of a 0.0022MF capacitor 184 and a 680 ohm resistor 186. The point of common connection between capacitor 184 and resistor 186 is interconnected to the emitter of transistor 182 through a choke 188. The emitter of transistor 182 is interconnected with its collector through a 2PF capacitor 190. The point of common connection between capacitor 184 and resistor 186 is interconnected with the end of parallel combination of inductor 164 and capacitor 166 associated with resistor 168 through a 120PF capacitor 192. The point of common connection between resistor 174 and capacitor 176 represents the output of detector 160 which is electrically interconnected with a band pass audio amplifier 194 through a 0.002MF coupling capacitor 196.

Capacitor 196 is electrically connected to the base of a type 2N5172 transistor 198 and interconnected to the collector of transistor 198 through a 1 Mohm resistor 200. The emitter of transistor 198 is connected to tie point 148 and interconnected with the collector of transistor 198 through a 0.001MF capacitor 202. The collector of transistor 198 is interconnected with the +9 VDC power supply through a 15 Kohm resistor 204 and to a second stage audio amplifier 206 through a 0.002MF coupling capacitor 208.

Capacitor 208 is connected to the base of a 2N5172 transistor 210 in audio amplifier 206. The emitter of transistor 210 is directly connected to tie point 148. The base of transistor 210 is interconnected to tie point 148 through the reversed biased diode 212. The collector of transistor 210 is interconnected with its base through a 1 Mohm resistor 214 and with the +9 VDC power supply through a 10 Kohm resistor 216. The collector of transistor 210 represents the output of audio amp 206 which is interconnected with an output terminal S through a 0.0015 MF filter capacitor 218. Terminal S is interconnected to tie point 148 through a variable inductor 220.

Referring to FIG. 4C, terminal S corresponds with terminal S of FIG. 4A and is connected to the cathode of a diode 222. A 15PF capacitor 224 is connected in parallel with diode 222 and coacts therewith to form a diode detector 226 which rectifies the audio signal coming out of audio amp 206. The cathode of diode 222 is connected to tie point 148 through a 0.0MF capacitor 228. Inductor 220 and capacitor 228 constitute a filter tuned to 20 KHz.

The anode of diode 222 represents the output of diode detector 226 and is connected to the input of a DC filter 230. The anode of diode 222 is connected to tie point 148 through a 0.01MF capacitor 232 and to tie point 148 through a 510 Kohm resistor 234. The anode of diode 222 is also connected to tie point 148 through a series combination of a 220 Kohm resistor 236 and a 0.22MF electrolytic capacitor 238. The point of common connection of resistor 236 and capacitor 238 is interconnected with the base of a type 2N5172 transistor 240 through a 22 Kohm current limiting resistor 242. DC filter 230 comprises capacitors 232 and 238 as well as resistors 236 and 234, the output being the point of common connection of resistor 236 and capacitor 238. Resistor 242 represents the input of a Schmidt trigger 244.

The emitter of transistor 240 is interconnected to tie point 148 through a 510 ohm resistor 245 and connected directly to the emitter of another type 2N5172 transistor 248. The collector of transistor 240 is interconnected with the +9 VDC power supply through a 100 Kohm resistor 250 and directly to the base of transistor 248. The collector of transistor 248 is also interconnected to the +9 VDC power supply through a 47 Kohm resistor 252. The collector of transistor 248 represents the output of Schmidt trigger 244, which is composed of transistors 240 and 248 and resistors 246, 250 and 252.

The output of Schmidt trigger 244 is connected to the input of an inverter 254. The base of a 2N5172 transistor 256 is interconnected to the collector of transistor 248 through a 47 Kohm resistor 258 and to the emitter of transistor 256 through a resistor 260. The emitter of transistor 256 is connected to tie point 148. The collector of transistor 256 is interconnected with the +9 VDC power supply through a 100 Kohm resistor 262 and to a receiver output terminal 264 which interfaces receiver circuit 134 with decoder circuit 136. Receiver circuit 134 of receiver unit circuit 136 thus operates to simultaneously receive signals (A-D in FIG. 8) from all four wheel mounted transmitter units 10, filter, amplify and shape the composite signal until it emerges from terminal 264 representing the composite of the received signals as represented by signal F in FIG. 7. Note that the width of the pulses in signals A-X of FIGS. 7 and 8 have been exaggerated for purposes of clarity. Although the pulses representative of those received from wheels A and C in the composite nearly abut one another there is some separation therebetween and the foregoing logic circuit will treat same as two discrete pulses.

Referring to FIG. 4C, decoder circuit 136 contains a timer circuit 266 which, in component lay out and operation is virtually identical to timer circuit 56 receiver circuit 11. The cathode of a PUT 268 is interconnected with tie point 148 through a 22 ohm resistor 270. The anode of PUT 268 is interconnected to the +9 VDC power supply through a 1.5M resistor 272 and to tie point 148 through a 25MF electrolytic capacitor 274. The gate of PUT 268 is connected directly to the emitter of a type 2N5172 transistor 276, the base of which is interconnected to tie point 148 through a series connected 620 Kohm resistor 280 and a timing resistor 282. Depending upon component tolerance stackup, resistor 282 may vary anywhere from 0 to 200 Kohms. The base of transistor 276 is also connected to tie point 148 through a 0.027MF capacitor 284. The base of transistor 276 is also interconnected with the +9 VDC power supply through a 470 Kohm resistor 286. The collector of transistor 276 is interconnected of a 5.1 Kohm resistor 288 and a 1.1 Kohm resistor 290. The point of common connection between resistors 288 and 290 is connected to the base of a type 2N6076 transistor 292. The emitter of the transistor 292 is connected directly to the +9 VDC power supply and the collector is interconnected to tie point 148 through a 51 Kohm resistor 294. The collector of transistor 292 is the output of timer circuit 266 and is connected to terminals U and X. The signal generated at the output of timer circuit 266 will have substantially the same period as the output signal of timer circuit 56 but will have a pulse width of 10 to 30 ms and is represented by signal E in FIG. 7. Timing circuit 266, by generating a succession of consecutive timing pulses, produces pre-established increments of time which are employed by decoder circuit 136 to count the number of pulses at the output of receiver circuit 134 during each predetermined increment of time or between consecutive pulses as will be described in detail hereinbelow. The inclusion of capacitor 284 in timing circuit 266 is for the purposes of filtering any noise eminating from the power supply.

Referring to FIGS. 4B and 4C, a signal representative of the composite of pulses received from wheels A through D will exit receiver circuit 134 via terminal 264, passing into an inverter 296 in decoder circuit 136. Inverter 296, as are all the inverters to be described hereinbelow, is of the type manufactured by National Semiconductor Model CD4049BCN. For the purposes of the present specification, particular manufacturers' model numbers of integrated circuits will be given for illustrative purposes only, it being contemplated that other readily available commercial substitutes could be used. Where appropriate, pin numbers of particular integrated circuits will be designated by Roman Numerals which correlate with the designation made by that particular manufacturer.

The output of inverter 296 is connected to input terminal II of a counter 298 such as that manufactured by National Semiconductor Model CD4518BCN. The output of timer circuit 266 is connected to the reset terminal VII of counter 298 through an intermediate 100 Kohm resistor 300. Reset terminal VII of counter 298 is also connected tie point 148 through an intermediate 0.05MF capacitor 302. Resistor 300 and capacitor 302 comprise a time delay circuit which receive a pulse train from timer circuit 266 (E of FIG. 7) and feeds that reset input VII but delayed by an RC time constant established by resistor 300 and capacitor 302. Inverter 296 inverts and shapes the incoming signal from receiver circuit 134 for counter 298. Counter 298 operates to count incoming pulses. When the count reaches four, output terminal V of counter goes high and disables counter 298 from counting any additional pulses by virtue of interconnection of output V with clock terminal I. Once reaching the count of four, counter 298 will thus ignore any additional pulses received on its input terminal II. Counter 298 operates to reset each time a pulse is received on terminal VII. Therefore, shortly (10 to 50 ms) after timer circuit 266 fires, counter 298 resets. If four pulses had not been received by that time, output terminal V will not have gone high, but counter 298 is connected to terminals T, V and Z interfacing FIGS. 4B and 4C. In FIG. 4B, terminal T is connected to one of the inputs of a NAND gate 304 the output of which is connected an input of another NAND gate 306. The output of NAND gate 306 is connected to the reset input XV of a second counter 308. The output of timer circuit 266 is connected to input terminal X of counter 308 through interfacing terminal U and an inverter 310. Terminal XVI of counter 308 is connected to the +9 VDC power supply and interconnected with the tie point 148 through a 0.005MF decoupling capacitor 312. Input terminal X of counter 308 is also interconnected to tie point 148 through a 0.005MF filter capacitor 314. Terminal VIII of counter 308 is tied directly to tie point 148. Output terminal XIII is tied directly to clock terminal IX of counter 308 and interconnected to the remaining input of NAND gate 304 through an inverter 316.

Counter 308 operates to count the number of consecutive times four receiver pulses were not received in one receiver clock period, i.e. number of consecutive clock periods that output terminal V of counter 298 did not go high. The output line from counter 298 is represented by signal G of FIG. 7 which is reset low until the leading edge of the fourth pulse of the composite signal F is received, in which case the output goes high until reset occurs by the leading edge of timing pulses in signal E. Because timer circuit 266 is connected to the input X of counter 308, it will increment or count by one each time a negative edge of pulse of signal E is received. Counter 308, however, always resets when output V of counter 298 goes high unless it itself has counted to four. In that case, output terminal XIII of counter 308 goes high by virtue of its being directly connected to clock terminal IX, disables counter 308, by turning off gate 304. In this mode, the signal on line 318 will be low, turning on a light 320 and buzzer 322.

Signals H through L in FIG. 7 represent a hypothetical situation in which the generator associated with wheel C ceases to operate sometime during a third cycle of operation. Accordingly, the output signal (H) will cease to contain pulses thereinafter and the elimination of that one pulse will be reflected in the output of receiver circuit 134 in signal I which during the third cycle of operation and thereafter contains only three pulses per timing interval. Because counter 298 is no longer receiving four counts per timing interval, its output terminal V will no longer go high as reflected in signal J. With no reset pulses being received by counter 308, the succeeding timer circuit 266 pulses (signal K) are counted through input terminal X of counter 308 and upon the fourth count the output terminal XIII thereof goes high as reflected in signal L. In this mode, light 320 and buzzer 322 are latched on and will remain on until four consecutive valid pulses (containing four counts per timing interval) are received by a third counter 324.

The output of inverter 310 is also connected to the input terminal X of counter 324. All of the inverters described herein operate as buffers and wave shapers. Clock terminal IX of counter 324 is connected directly to tie point 148 and terminal XVI is connected directly to +9 VDC power supply as well as interconnected to tie point 148 through an intermediate 0.005MF decoupling capacitor 326. Input terminal X of counter 324 is also connected to tie point 148 through a 0.005 MF filter capacitor 327. The output of timer circuit 266 is interconnected to one of the inputs of a NAND gate 328 through a 0.02MF capacitor 330. That input of NAND 328 is also connected to tie points 148 through a reverse biased clamping diode 322 and a 10 Kohm resistor 334. Resistor 334 and capacitor 330 serve as a high pass filter to pass a spike corresponding with the leading edge of pulses generated by timing circuit 266. Output terminal V of counter 298 is interconnected to the remaining input of NAND gate 328 through an inverter 336. The output of NAND gate 328 is connected to one of the inputs of another NAND gate 340. The output of NAND gate 340 is connected to the reset input XV of counter 324. The other input of NAND gate 340 is connected to the output XIII of counter 308. The output XIII of counter 324 is interconnected with the remaining input of NAND gate 306 through a series combination of a 10 Kohm resistor 342 and an inverter 344. The point of common connection between resistor 342 and inverter 344 is connected to tie point 148 through a 0.005MF capacitor 346.

Counter 324 operates to count the number of consecutive periods that at least four pulses are received by counter 298 under conditions when light 320 and buzzer 322 are latched on. Counter 324 effectively determines when to turn light 320 and buzzer 322 off and during normal operating conditions does nothing else. Counter 324 is enabled when the output terminal XIII of counter 308 goes high whereby counter 324 will reset each time four pulses are not received from counter 289. When four consecutive pulses are received from counter 289, gates 328 and 340 disable counter 324 from receiving a reset pulse via line 348 from timer circuit 266 at which time counter 324 will hold its present count. When counter 324 receives four counts, its output terminal XIII goes high, enabling counter 308 to receive a reset pulse from NAND gate 306. Output terminal XIII of counter 308 then goes low which, in turn, causes gate 340 to go high, resetting counter 324. Resistor 342 and capacitor 346 operate as a delay to insure inactment of the above described sequence.

NAND gates 304, 306, 328 and 340 are of the type manufactured by National Semiconductor Model CD4011BCN.

To better describe operation of the present tire pressure monitoring system under varying failure modes, two examples are set forth and graphically presented in FIG. 8. The first example is a situation in which wheel C has been operating normally but fails to generate an output pulse during the third and fourth cycles of operation and then reestablishes a proper output pulse during the fifth cycle and continues operating properly thereafter. This operation is reflected in signal M. The resulting output of receiver circuit 134 is reflected in signal N in which only three pulses are received during the third and fourth cycles of operation. Upon not detecting an output pulse from counter 298, (signal O), counter 308 will count up two as reflected in signal P. However, during operating cycle 5 and output pulse is detected from counter 298 and a reset pulse (signal Q) is detected on reset input XV of counter 308.

Second example illustrates operation of counter 324 and a situation in which four consecutive time intervals pass in which no output was detected from counter 298 and counter 308 latched light 320 and buzzer 322 on. Signal R again represents that ever-troublesome wheel C which has not been generating output pulses, but during cycle one generates a single pulse but none in cycle two and finally reestablishes normal operating conditions during cycle three and maintains a succession of tire inflation condition signals (pulses) thereafter. The composite output signal of receiver circuit 134 is represented by signal S in which during the first cycle the requisite four pulses are received by counter 298 and an output pulse (signal T) is generated at the output of counter 298. During the second cycle of operation however, no output from counter 298 is received and counter 324 is reset. Starting with the third cycle of operation and continuing during successive timing intervals thereafter, output pulses from counter 298 are received. Upon receiving the fourth successive output pulse from counter 298 during cycle six, counter 324 will reset counter 308, causing output terminal XIII therefore to go low, whereby line 318 goes high shutting off light 320 and buzzer 322.

A start-up circuit 350 comprises a fourth counter 352 whose input II is connected through terminal Z to the output V of counter 298. Reset terminal VII of counter 352 is interconnected with reset terminal VII of counter 298 through a diode 354 (FIG. 4C). Reset terminal VII of counter 352 is connected to tie point 148 through a reverse biased diode 356, and to tie point 148 through an intermediate 100 Kohm resistor 358. Reset terminal VII of counter 352 is also interconnected to the +9 VDC power supply through a 1 MF capacitor 360 and interconnected to the point of common connection between resistors 342 and inverter 344 through a forward biased diode 362. Terminal VIII of counter 352 is connected directly to tie point 148. Output terminal III and clock terminal I of counter 352 are commonly interconnected to a node 364 through a reversed biased diode 366. The output of inverter 316 is interconnected through line 318 to node 364 through a reversed biased diode 368. Node 364 is interconnected to the +9 VDC power supply through a 100 Kohm resistor 370.

Operation of start-up circuit 350 can best be understood by referring to signals V, W, and X FIG. 8. Signal V simply represents the initiation of power to the circuit at the beginning of cycle four. At that time, capacitor 360 charges, causing counter 352 (as well as counter 308 via diode 362, inverter 344 and NAND gate 306) to reset. Upon reset the output terminal III of counter 352 is low representing an inverse of signal X. Near the end of operation cycle four, an output pulse is received from counter 298 into input II of counter 352. At that time, the output III of counter 352 goes high and, by virtue of its being directly interconnected with clock terminal I, latches itself indefinitely until another start up sequence is detected. Counter 352 clocks or counts on the negative edge of output pulses from counter 298. This mode of operation represents a self-check or or fail-safe feature of the present invention.

In application, when the vehicle is first started, light 320 and buzzer 322 will be turned on until the trailing edge is detected of the first output pulse from counter 298. Typically, this will be one cycle of operation for approximately 30 seconds but if for some reason counter 298 is not receiving four pulses per timing interval, the light and buzzer will remain on, indicating to the vehicle operator that an abnormal tire condition exists. This type of arrangement has the particular advantage of being readily accepted by the automobile industry as well as typical automobile operators inasmuch as they have been physiologically attuned in resent years to receive self-check and system operation verification data via the vehicle instrumentation during vehicle start-up mode. Typically, this is manifested in warning lights which are turned on during the starting mode to indicate to the operator that they are operational and which turn off once the starting cycle is completed. This system therefore will effect a self-check sequence each time the vehicle is started or restarted and does not demand post start-up sequence drive attention to confirm normal system operation.

The present invention also has an additional self-check feature inherent in normal system operation. This feature exists by virtue of the fact that abnormal tire inflation conditions are detected through the absence of a signal from each wheel mounted transmitter. If the receiver fails to receive a signal from one of the transmitters, it will deduce that an abnormal condition exists. However, failure of the transmitter for any reason (low battery, shorted pressure switch contacts, etc.) in which pulses are no longer generated, are treated as a low tire condition. Accordingly, the present invention will detect most causes of system failure during operation, as well as polling the transmitters for proper operation during the vehicle start-up mode.

Node 364 is interconnected with the base of a type 2N5172 transistor 372 through the series combination of an inverter 374 and 10 Kohm current limiting resistor 376. The emitter of transistor 372 is connected directly to tie point 148 and interconnected with the base of transistor 372 through a 100 K hold down resistor 378. The collector of transistor 372 is interconnected to a +12 VDC unregulated power supply through a series combination of a 1 Kohm current limiting resistor 380 and 100 Kohm hold down resistor 382. The point of common connection between resistors 380 and 382 is connected to the base of a transistor 384 of the type manufactured by Motorola, Inc. model MPS-A55. The emitter of transistor 384 is connected to the +12 VDC power supply. The collector of transistor 384 is connected to tie point 148 through parallel combination of a reverse biased fly-back diode 386 in a 1 MF filter capacitor 388. The collector of transistor 384 is also electrically connected to tie point 148 through a 0.005 MF filter capacitor 390 which is physically located proximate a ferrite bead 392. A line from the collector of transistor 384 passes through ferrite bead 392 to a parallel connection of light 320 and buzzer 322, the other end of which is connected to tie point 148. Capacitor 390 and ferrite bead 392 act as an LC filter. The circuitry down stream of inverter 374 assure adequate power and filtering is supplied to light 320 and buzzer 322.

Figure 6:
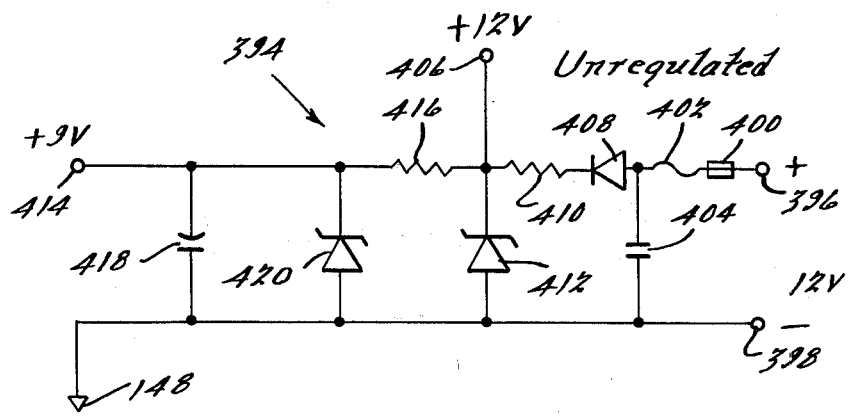
FIG. 6, is a schematic diagram of the receiver power supply.

Referring to FIG. 6, a power supply 394 is illustrated. Plus and minus terminals 396 and 398 respectively are connected to the associated vehicles' 12 VDC ignition system. Minus termina 398 is connected directly to tie point 148. Positive terminal 398 is interconnected with negative terminal 398 through a series combination of a ferrite bead 400, a fuse 402, and a 0.005 MF capacitor 404. Capacitor 404 and ferrite bead 400 act as an LC filter. The point of common connection between capacitor 404 and fuse 402 is interconnected with a +12 VDC (unregulated) terminal 406 through a forward biased diode 408 and a 5 ohm resistor 410. Terminal 406 is also interconnected with minus terminal 398 through a reverse biased zenier diode 412 and a +9 VDC regulated output terminal 414 through a 56 ohm resistor 416. Terminal 414 is interconnected with tie point 148 through a parallel combination of a 2.2 MF capacitor 418 and a reverse biased zenier diode 420. The operation of the power supply 394 is straight forward and will not be elaborated upon here for the sake of brevity. Terminal 406 is electrically interconnected with any indicated +12 VDC terminals in FIGS. 4A, 4B, or 4C. Likewise, terminal 414 is to be electrically interconnected with any +9 VDC input terminals noted in FIGS. 4A, 4B, or 4C.

When optional switch 64 (refer FIG. 3) is employed to deenergize transmitter circuit 11, an enabling circuit is included with the receiver which operates to detect vehicle motion and to effectively disable counter 308 at times when the vehicle is running but not moving, i.e. in the operating mode when switches 64 have momentarially disabled or deenergized transmitter circuits 11 do to the vehicle pausing at a traffic light or the like. Optionally, an RC timer could be included to open switch 64 several minutes after vehicle motion had closed.

It is to be understood that the invention has been described with reference to a specific embodiment which provides the features and advantages previously described, and that such specific embodiment is susceptible of modification as will be apparent to those skilled in the art. For example, the transmitted pulses from the wheels can be coded to allow the receiver to discern which wheel has a low pressure condition. Accordingly, the foregoing description is not to be construed in a limiting sense.

What is claimed is:

1. A tire pressure monitoring system comprising:
radio transmitter means operative to monitor fluid pressure within a pneumatic tire and to generate a uniformly timed succession of tire inflation condition signals when said pressure falls within a predetermined operating range; and
means operative to receive and count said tire condition signals and to generate an operator alerting signal when less than a predetermined number of said tire condition signals are received during a preestablished increment of time.

2. The system of claim 1, wherein said time increment is recurring and said operator alerting signal is generated when less than said predetermined number of tire condition signals are received during any of said increments.

3. The system of claim 1, wherein said operating range comprises any pressure equaling or exceeding a predetermined set point level.

4. The system of claim 1, further comprising means operative to detect start-up of a vehicle associated with said system and to generate a system operation verification signal of said start-up until a second predetermined number of said tire condition signals are received from said transmitter means between two consecutive timing pulses.

5. The system of claim 4, wherein said predetermined number equals said second predetermined number.

6. The system of claim 5, wherein said predetermined number equals one.

7. A tire pressure monitoring system comprising:
radio transmitter means operative to monitor fluid pressure within a pneumatic tire and to generate a uniformly timed succession of tire inflation condition signals when said pressure substantially equals a predetermined set point level; and
means operative to receive and count said tire condition signals, establish a succession of timing pulses and generate an operator alerting signal when less than a predetermined number of said tire condition signals are received between two consecutive timing pulses.

8. The system of claim 7, wherein said transmitter means generates said tire condition signals continuously and with a substantially constant period.

9. The system of claim 8, wherein said tire condition signals have a pulse width substantially shorter than said period.

10. The system of claim 7, wherein said radio transmitter means comprises:
a source of electrical energy;
an RF transmitter having a characteristic far field; and
a pressure sensing switch operative to electrically interconnect said transmitter and energy source when the pressure within the tire exceeds a predetermined value.

11. The system of claim 10, wherein said source comprises a wheel mounted battery.

12. the system of claim 10, wherein said RF transmitter and switch are mounted within the cavity defined by the associated tire and wheel, and said receiver means is disposed in the far field of said transmitter.

13. The system of claim 8, wherein said period is in excess of thirty seconds.

14. The system of claim 7, further comprising means operative to delay generation of said operator alerting signal until receipt of less than a second predetermined number of said tire condition signals between each of a plurality of subsequent sets of consecutive timing pulses.

15. The system of claim 14, wherein said plurality equals a predetermined fixed number.

16. The system of claim 14 wherein said plurality equals three.

17. The system of claim 10, wherein said source comprises a wheel mounts emf generator.

18. The system of claim 7, further comprising means operative to delay generation of said operator alerting signal until receipt of less than a second predetermined number of said tire condition signals between at least one additional subsequent set of consecutive timing pulses.

19. The system of claims 14 or 18, wherein said predetermined number equals said second predetermined number.

20. A tire pressure monitoring system for use with a vehicle having a plurality of pneumatic tires and associated mating wheels, said system comprising:
a plurality of radio transmitter means, one associated with each tire, each said transmitter means having a characteristic far field and operative to monitor fluid pressure within its associated tire and to generate a uniformly timed succession of tire inflation condition signals when said pressure falls within a predetermined operating range; and
means operative to receive and cumulatively count said tire condition signals, establish a succession of timing pulses and generate an operator alerting signal when less than a predetermined number of said tire condition signals are received from each transmitter means between two consecutive timing pulses.

21. The system of claim 20, wherein said operating range comprises any pressure equaling or exceeding a predetermined set point level.

22. The system of claim 20, wherein said receiver is disposed with the far field of said transmitter means.

23. The system of the claim 20, further comprising means operative to detect start-up of said vehicle and to generate a system operation verification signal of said start-up until a second predetermined number of said tire condition signals are received from each transmitter means between two consecutive timing pulses.

24. The system of claim 23, wherein said predetermined number equals said second predetermined number.

25. A tire pressure monitoring system for use with a vehicle having a plurality of pneumatic tires and associated mating wheels, said system comprising:
a radio transmitter associated with each tire, each said transmitter having an associated far field and comprising: a battery mounted for rotation with its associated wheel on the external surface thereof; an RF transmitter mounted within the cavity defined by the associated tire and wheel for rotation therewith; and a pressure switch operative to electrically interconnect said battery and transmitter when the fluid pressure within the associated tire substantially equals a predetermined set point level, said transmitter operating during said interconnection to generate a constant rate continuing succession of RF tire inflation condition signals; and
an RF receiver disposed within the chassis of said vehicle and operative to receive and cumulatively count the tire condition signals received from all of said transmitters, establish a succession of internal timing pulses and generate an operator alerting signal when less than a predetermined number of said tire condition signals are received between two consecutive timing pulses.

26. The system of claim 25, wherein said tire condition signals have a substantially constant period.

27. The system of claim 26, wherein said tire condition signals have a pulse width substantially shorter than said period.

28. The system of claim 26, wherein said period is in excess of thirty seconds.

29. The system of claim 25, wherein said receiver is disposed within the far field of said transmitter means.

* * * * *